O. H. Perry.
Moulding Machine.
Nº 71531   Patented Nov. 26, 1867.
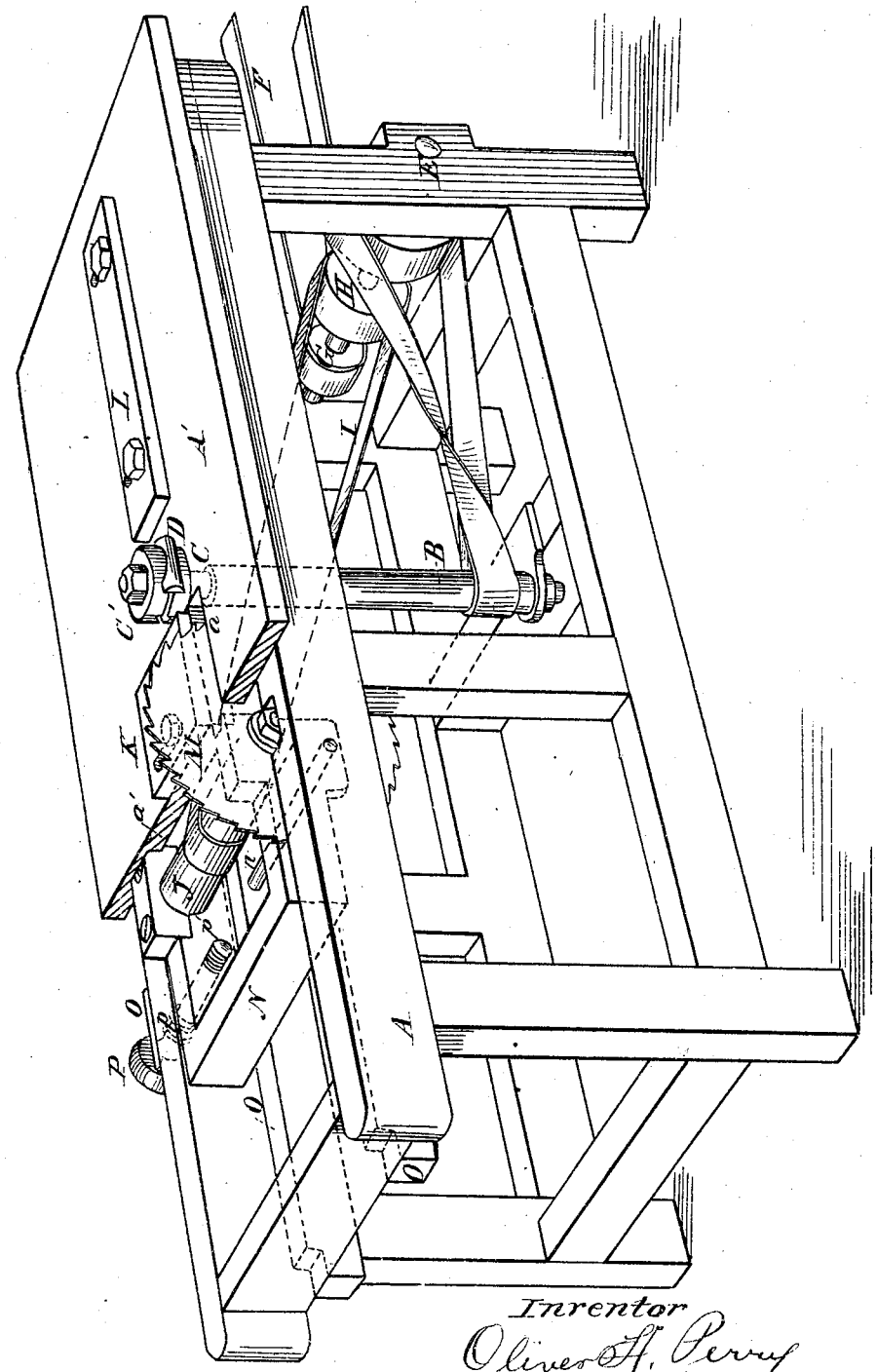
Witnesses
Frank Millwald
Joseph A. Meader
Inventor
Oliver H. Perry
By Knight Bros
Attys

United States Patent Office.

OLIVER H. PERRY, OF CINCINNATI, OHIO.

Letters Patent No. 71,531, dated November 26, 1867.

IMPROVEMENT IN MOULDING-MACHINES.

*The Schedule referred to in these Letters Patent and making part of the same.*

TO ALL WHOM IT MAY CONCERN:

Be it known that I, OLIVER H. PERRY, of Cincinnati, Hamilton county, State of Ohio, have invented a certain new and useful Combined Moulding and Sawing-Machine; and I do hereby declare the following to be a full, clear, and exact description thereof, reference being had to the accompanying drawing, making part of this specification.

My invention consists of an arrangement of sawing and moulding-devices, by which mouldings can be sawn out and shaped on the same table and at one operation. The accompanying drawing is a perspective view, partly in section, of a machine embodying my invention.

A is the frame of the machine, and A' the top or table, partly cut away to exhibit the saw-adjusting devices. B is a vertical cutter-shaft, suitably journalled in the frame, and fitted with a separable cutter-head C C' and cutter D. This cutter-shaft is operated by a "quartering-belt" from counter-shaft E, journalled, as shown, in the frame. The shaft E is driven by belt F and pulley G, and carries another pulley H, for giving motion to the saw through belt I and horizontal saw-spindle J. The table A is slotted at $a$, in the ordinary way, to accommodate the saw, and provided with the customary saw-table guides K L. The spindle J of the saw M is journalled in the laterally-adjustable sliding carriage N, which rests upon the timbers O, and is confined to a path across the frame by recesses $a'$ in the table A', and by bar $n$ which stretches across the carriage, and passes through apertures in timbers O. The carriage N and saw M are adjusted laterally in any desired relation to the position of the fixed cutter-shaft B, by means of the screw P, which is confined to a rotary path in the plate Q by collars $p$, and is tapped into the carriage at $p'$. The screw P also serves to hold the carriage in any position to which it may be adjusted.

This combined machine enables the mouldings to be cut and shaped by one operation, thus very materially economizing in labor and repairs, and requiring less space to produce any given amount of mouldings than any sets of machines for the purpose in present use. I do not desire to confine myself to the exact arrangement of parts as described, the invention admitting of some little modification; as, for instance, the shafts may in some cases be reversed in position, the cutter-shaft being horizontal, and the saw-spindle vertical.

I am aware that a cutter-head for rounding the edge of a board and a saw for sawing a barrel-hoop, when so formed therefrom, have been used, and such devices I do not broadly claim, but What I do claim, and desire to secure by Letters Patent, is—

The cutter-head C', adjustable guides L and K, slotted table A', and saw M, when arranged in relation to each other, and operating substantially as and for the purpose described.

In testimony of which invention, I hereunto set my hand.

OLIVER H. PERRY.

Witnesses:
GEO. H. KNIGHT,
JAMES H. LAYMAN.